United States Patent
Straitiff

(10) Patent No.: US 7,844,766 B1
(45) Date of Patent: Nov. 30, 2010

(54) SYSTEM AND METHOD FOR LOCATION SPECIFIC COMPUTER ENABLED SERVICES/MONITORING

(75) Inventor: David M. Straitiff, Buffalo, NY (US)

(73) Assignee: XETA Technologies, Inc., Broken Arrow, OK (US)

( * ) Notice: Subject to any disclaimer, the term of this patent is extended or adjusted under 35 U.S.C. 154(b) by 235 days.

(21) Appl. No.: 12/245,234

(22) Filed: Oct. 3, 2008

(51) Int. Cl.
*G06F 19/00* (2006.01)

(52) U.S. Cl. .................... 710/72; 717/171; 717/172; 717/173

(58) Field of Classification Search .................. None
See application file for complete search history.

(56) References Cited

U.S. PATENT DOCUMENTS

| | | | |
|---|---|---|---|
| 5,038,320 | A | 8/1991 | Heath et al. |
| 5,247,683 | A | 9/1993 | Holmes et al. |
| 5,307,354 | A | 4/1994 | Cramer et al. |
| 5,771,381 | A | 6/1998 | Jones et al. |
| 6,266,809 | B1 * | 7/2001 | Craig et al. .................. 717/173 |
| 6,487,624 | B1 | 11/2002 | Erickson et al. |
| 6,574,695 | B1 | 6/2003 | Mott et al. |
| 6,738,382 | B1 | 5/2004 | West et al. |
| 6,934,754 | B2 | 8/2005 | West et al. |
| 6,961,795 | B2 | 11/2005 | Erickson et al. |
| 6,970,927 | B1 | 11/2005 | Stewart et al. |
| 6,996,073 | B2 | 2/2006 | West et al. |
| 7,055,148 | B2 * | 5/2006 | Marsh et al. ................. 717/172 |
| 7,181,608 | B2 * | 2/2007 | Fallon et al. .................... 713/2 |
| 7,207,039 | B2 * | 4/2007 | Komarla et al. .............. 717/178 |
| 7,219,343 | B2 * | 5/2007 | Almeida et al. .............. 717/172 |
| 7,222,339 | B2 * | 5/2007 | Rothman et al. ............. 717/168 |
| 7,249,353 | B2 * | 7/2007 | Zarco .......................... 717/171 |
| 7,251,725 | B2 * | 7/2007 | Loison et al. .................. 713/1 |
| 7,376,772 | B2 * | 5/2008 | Fallon .......................... 710/68 |
| 7,516,450 | B2 * | 4/2009 | Ogura ........................ 717/168 |
| 7,562,360 | B2 * | 7/2009 | Tai et al. ..................... 717/178 |
| 7,667,616 | B2 * | 2/2010 | Fair et al. .............. 340/825.69 |
| 7,673,130 | B2 * | 3/2010 | Miyamoto et al. ............. 713/2 |
| 7,698,698 | B2 * | 4/2010 | Skan .......................... 717/168 |
| 7,721,000 | B2 * | 5/2010 | Kim ........................... 709/247 |
| 7,725,889 | B2 * | 5/2010 | Gustafson et al. ........... 717/168 |

(Continued)

OTHER PUBLICATIONS

Maxim, DS2401 Data Sheet, 2006, Dallas Semiconductor, pp. 1-10.*

*Primary Examiner*—Cheng-Yuan Tseng
(74) *Attorney, Agent, or Firm*—Burns & Levinson LLP; Orlando Lopez

(57) ABSTRACT

A system and method to provide location-specific computer enabled services/monitoring, having minimally invasive reconfiguration/replacement comprises a relationship provider enabling a first relationship between a location and electronic configuration information and a second relationship between the location and an electronic identifier, an electronic service connecting/monitoring component at the location including an electronic component having the electronic identifier embodied therein, and a readable component providing the electronic identifier in an electronically readable format, an accessor accessing the electronic identifier from the readable component, accessing the location associated with the accessed said electronic identifier according to the second relationship, and accessing the electronic configuration information associated with the associated location according to the first relationship, and a server location the associated said electronic configuration information onto the service connecting/monitoring component and enabling modification of the associated the electronic configuration information to reconfigure based on the location.

25 Claims, 4 Drawing Sheets

U.S. PATENT DOCUMENTS

| | | | |
|---|---|---|---|
| 7,734,945 B1 * | 6/2010 | Levidow et al. ................ 714/3 | |
| 2003/0212616 A1 | 11/2003 | Castrogiovanni et al. | |
| 2004/0186902 A1 | 9/2004 | Stewart | |
| 2008/0065774 A1 | 3/2008 | Keeler | |

* cited by examiner

SYSTEM AND METHOD FOR LOCATION SPECIFIC COMPUTER ENABLED SERVICES/MONITORING

BACKGROUND

The system and method of the present embodiment relate generally to centralized control of a network infrastructure for a building. What is needed are a system and method for providing location-specific computer enabled services and monitoring, and having minimally invasive reconfiguration and replacement.

SUMMARY

The needs set forth above as well as further and other needs and advantages are addressed by the present embodiment. Solutions and advantages are achieved by the illustrative embodiment described herein below.

The method of the present embodiment for providing location-specific computer enabled services/monitoring, having minimally invasive reconfiguration/replacement, can include, but is not limited to including, the steps of providing a first relationship between a location and electronic configuration information, providing a second relationship between the location and an electronic identifier, providing, at the location, an electronic service connecting/monitoring component, the electronic service connecting/monitoring component comprising an electronic component having the electronic identifier embodied therein, and a readable component providing the electronic identifier in a electronically readable format, accessing the electronic identifier from the readable component, accessing the location associated with the accessed electronic identifier according to the second relationship, accessing the electronic configuration information associated with the associated location according to the first relationship, loading the associated electronic configuration information onto the service connecting/monitoring component, and enabling modification of the associated electronic configuration information to reconfigure based on the location.

The system of the present embodiment for providing location-specific computer enabled services/monitoring, having minimally invasive reconfiguration/replacement, can include, but is not limited to including, a relationship provider enabling a first relationship between a location and electronic configuration information and a second relationship between the location and an electronic identifier, an electronic service connecting/monitoring component at the location including an electronic component having the electronic identifier embodied therein, and a readable component providing the electronic identifier in an electronically readable format, an accessor accessing the electronic identifier from the readable component, accessing the location associated with the accessed the electronic identifier according to the second relationship, and accessing the electronic configuration information associated with the associated location according to the first relationship, and a server loading the associated the electronic configuration information onto the service connecting/monitoring component and enabling modification of the associated the electronic configuration information to reconfigure based on the location.

For a better understanding of the present embodiment, together with other and further objects thereof, reference is made to the accompanying drawings and detailed description.

DETAILED DESCRIPTION

The present embodiment is described more fully hereinafter with reference to the accompanying drawings, in which the present embodiment is shown. The following configuration description is presented for illustrative purposes only. Any computer configuration and architecture satisfying the speed and interface requirements herein described may be suitable for implementing the system and method of the present embodiment.

Figure 1:
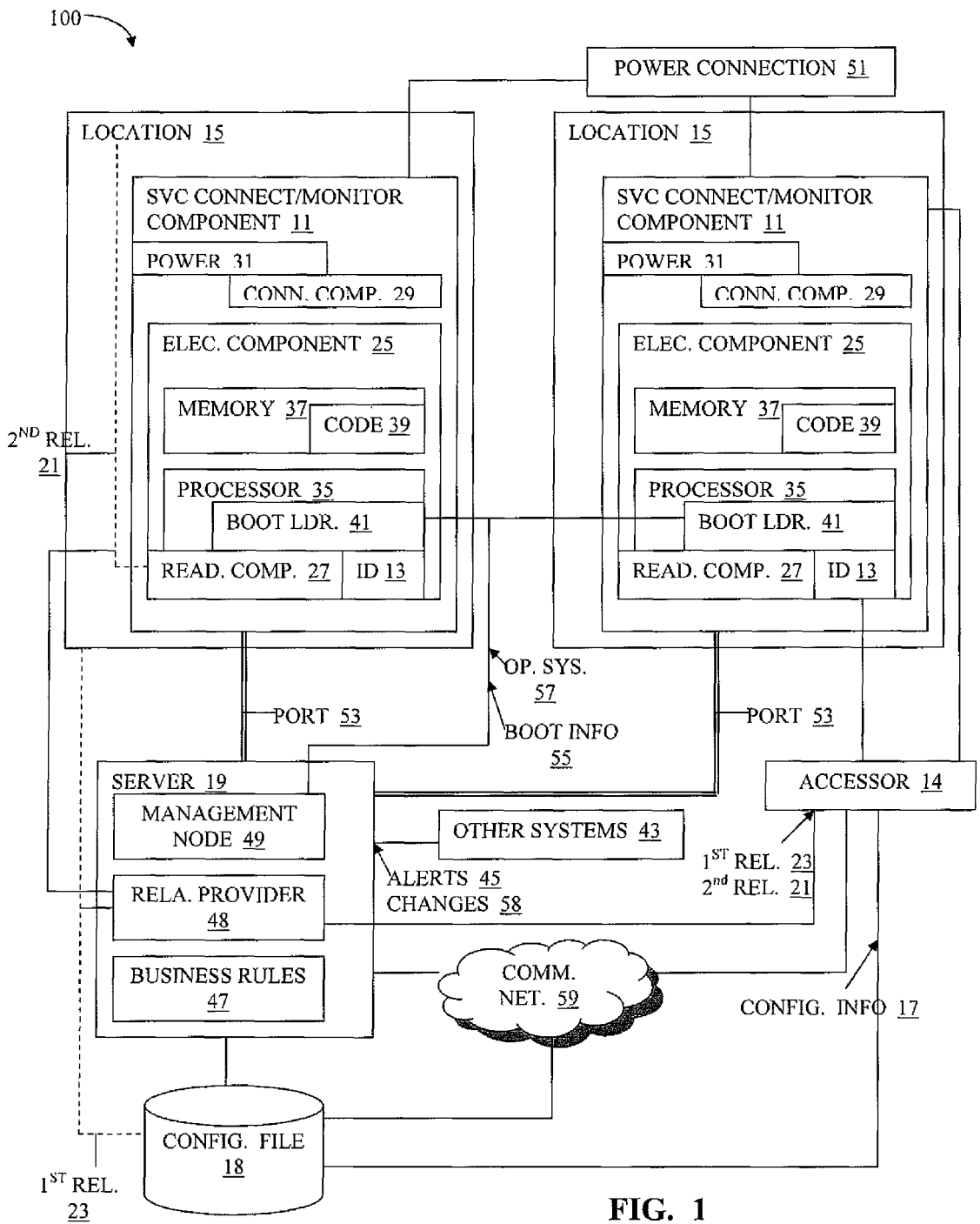
FIG. 1 is a schematic block diagram of the components of the event system of the present teachings.

Referring now to FIG. 1, system 100 for providing location-specific computer enabled services/monitoring, having minimally invasive reconfiguration/replacement can include, but is not limited to including, service connect/monitor component 11, server 19, other systems 43, first relationship 23, second relationship 21, accessor 14, port 53, and configuration information 17. Service connect/monitor component 11 can include, but is not limited to including, power connections 31, connection components 29, and electronic component 25. Electronic component 25 can include, but is not limited to including, memory 37, code 39, processor 35, boot loader 41, readable component 27 such as, for example, barcode 13B (FIG. 2), and identifier 13 such as, for example, ID chip 13A. Service connect/monitor component 11 can be installed at location 15, and first relationship 23 can be established between location 15 and configuration information 17. Second relationship 21 can be established between location 15 and readable component 27. Server 19 can include, but is not limited to including, management node 49, relationship processor 48, and business rules 47. Server 19 and service connect/monitor component 11 can communicate through port 53. Other systems 43 can provide data to management node 49 that could assist in the centralized management of service connect/monitor component 11. There may be any number of service connect/monitor components 11 all managed by server 19. Power 31 may be supplied, for example, locally, centralized, or in line, to service connect/monitor component(s) 11. Relationship provider 48 can enable first relationship 23 between location 15 and electronic configuration information 17 and second relationship 21 between location 15 and an electronic identifier 13. Electronic service connecting/monitoring component 11 at location 15 can include electronic component 25 having electronic identifier 13 embodied therein, and readable component 27 providing electronic identifier 13 in an electronically readable format. Accessor 14 can access electronic identifier 13 from readable component 27, and can access location 15 associated with accessed electronic identifier 13 according to second relationship 21, and can access electronic configuration information 17 associated with associated location 15 according to first relationship 23. Server 19 can load associated electronic configuration information 17 onto service connecting/monitoring component 11 and enable modification of associated electronic configuration information 17 to reconfigure location 15.

Figure 2:
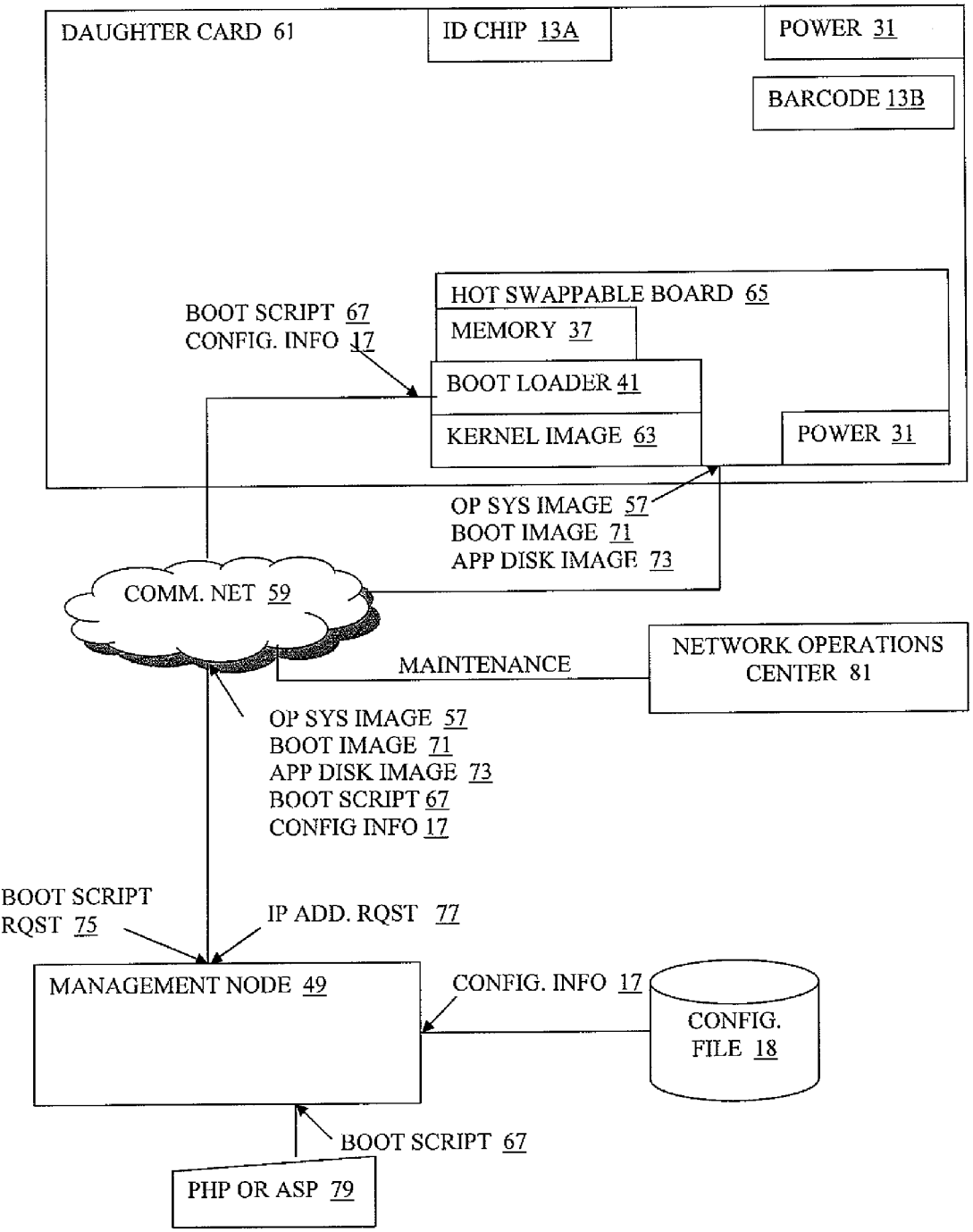
FIG. 2 is a schematic block diagram of an alternate embodiment of the present teachings.

Continuing to refer primarily to FIG. 1, optionally, service connecting/monitoring component 11 can be configured as daughter card 61 (FIG. 2) having connection components 29 and power connectors 31. Electronic component 25 can be configured as hot-swappable board 65 (FIG. 2). Hot-swappable board 65 (FIG. 2) can receive power through power connection 31 from daughter card 61 (FIG. 2), and can include processor 35 and computer readable memory 37 having computer readable code 39 embodied therein. Hot-swappable board 65 (FIG. 2) can access electronic configuration information 17 associated with location 15 and loading electronic configuration information 17. Server 19 can provide first relationship 23 and second relationship 21. Daughter card 61 (FIG. 2) can be installed at the location 15, power can be provided to daughter card 61 (FIG. 2) through power connection 31, daughter card 61 (FIG. 2) and server 19 can be interconnected through port 53, and hot-swappable board 65 (FIG. 2) can be installed. Service connecting/monitoring component 11 can detect a failure in hot-swappable board 65 (FIG. 2) and can enable replacing the failing hot-swappable board (FIG. 2) with a new hot-swappable board. Service connecting/monitoring component 11 can also receive boot information 55 from server 19 into processor 35, execute boot information 55 (FIG. 2) to load operating system 57 (FIG. 2) from server 19 to processor 35, and execute operating system 57 (FIG. 2) to load associated electronic configuration information 17 downloaded from server 19. Server 19 can configure location 15 by downloading associated electronic configuration information 17 to hot-swappable board 65 (FIG. 2), and enable real time communications between server 19 and hot-swappable board 65 (FIG. 2). Power connection 31 can be a centralized power supply. Server 19 can be integrated with other systems 43 to provide alerts 45 based on business rules 47. Server 19 can detects events in hot-swappable board 65 (FIG. 2) by using business rules 47, and can receive changes 58 to business rules 47 from other systems 43. Server 19 can configure port 53 between server 19 and hot-swappable board 65 (FIG. 2) and can configure management node 49.

Referring now primarily to FIG. 2, service connecting/monitoring component 11 (FIG. 1) can include components for requesting a temporary IP address for hot-swappable board 65, receiving the temporary IP address, assigning a management VLAN for management communications, receiving a management node IP address to communicate with management node 49 (FIG. 1), and requesting a boot script 67 from management node 49 (FIG. 1) using the management node IP address and the management VLAN. Service connecting/monitoring component 11 (FIG. 1) can also include components for choosing, at management node 49, boot script 67 based on a required action for hot-swappable board 65, downloading, using boot script 67, boot image 71 to hot-swappable board 65, downloading, using boot script 67, an application disk image 73 to hot-swappable board 65, providing the management VLAN and an address of management node 49 to boot image 71, and booting boot image 71 from boot script 67. Service connecting/monitoring component 11 (FIG. 1) can still further include components for loading boot image 71 and application disk image 73 into memory 37 (FIG. 1) of hot-swappable board 65, retrieving daughter card unique identifier 13 (FIG. 1) from hot-swappable board 65, requesting a daughter card IP address associated with daughter card unique identifier 13 (FIG. 1), receiving the daughter card IP address, and retrieving the IP address associated with electronic identifier 13 (FIG. 1) and management node IP address. Service connecting/monitoring component 11 (FIG. 1) can even still further include components for translating electronic configuration information 17 (FIG. 1) to configuration commands, setting hot-swappable board 65 into a configuration mode, configuring hot-swappable board 65 based on the configuration commands, transitioning from the configuration mode to an operational mode, and reporting, from hot-swappable board 65, a status of hot-swappable board 65 to management node 49. Service connecting/monitoring component 11 (FIG. 1) can also include components for receiving electronic configuration information 17 (FIG. 1) in XML format from server 19, executing code such as, for example, a PHP script 79, on hot-swappable board 65 to parse electronic configuration information 17 (FIG. 1) into a configuration batch file, executing the configuration batch file to configure hot-swappable board 65, maintaining an event log, reporting the status in real time, providing the event log to management node 49, and reporting the status periodically. In an embodiment of the system of the present disclosure, the identification chip such as, for example, DALLAS SEMICONDUCTOR® DS2401, on the daughter card 61 can act as a media access controller (MAC) address or localized unique identifier (UID). Configuration information can be downloaded from server 19 via, for example, a serial identification chip of the daughter card 61 that can identify the hot-swappable board 65. When there is a problem, the hot-swappable board 65 can be swapped out for a new hot-swappable board 65, which can reduce maintenance costs. The connections remain in place, so there is no chance of incorrect wiring. A fiber interface may be included, and power may be hot swapped. In the present embodiment, there is an initial configuration for deployment which can be retrieved. The configuration can be maintain and monitored, and the system can include a network operations center (NOC) 81 (FIG. 2) which can be used for trouble identification and resolution. Monitoring can be proactive in the form of alarms and alerts. The hotswap process can be followed by a self-healing process. If a new hot-swappable board is supplied, it can automatically continue processing at the point at which the failed hot-swappable board ceased operations because management node 49 can stored configuration information 17 (FIG. 1). Because unique identifier 13 (FIG. 1) does not change when hot-swappable board 65 is replaced, management node 49 realizes that it is communicating with a replacement device.

Figure 3:
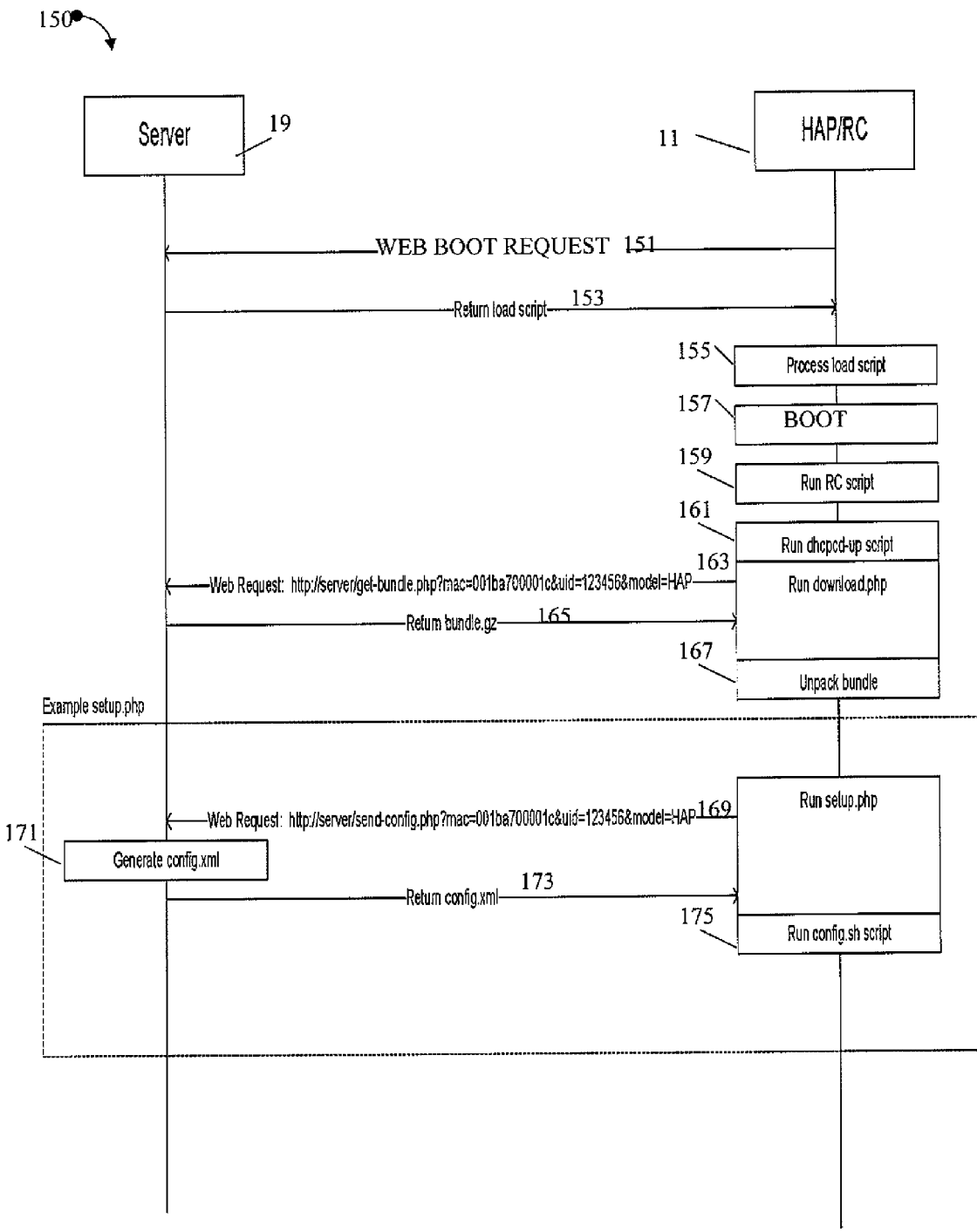
FIG. 3 is a flowchart of the boot sequence of the present teachings.

Referring now primarily to FIG. 3, method 150 can include, but is not limited to including, the steps of initiating 151, by electronic service connecting/monitoring component 11 (FIG. 1) such as, for example, Hospitality Access Point/ROOM CENTER® (HAP/RC), available from LORICA SOLUTIONS®, a web boot request to server 19 (FIG. 1) which returns 153 boot script 67 to electronic service connecting/monitoring component 11 (FIG. 1) which processes 155 boot script 67 (FIG. 2), boots 157 processor 35 (FIG. 1), runs 159 a customized script such as, for example, a room center script, and runs 161 a dhcpcd-up script. dhcpcd is an implementation of the DHCP client specified in either RFC2131 or RFC1541. The "-up" indicates that the interface between server 19 (FIG. 1) and electronic service connecting/monitoring component 11 (FIG. 1) has been booted with the same IP address as previously. Electronic service connecting/monitoring component 11 (FIG. 1) then and sends 163 a web request for, for example, PHP, to server 19 (FIG. 1) which returns 165 bundle.gz (explained previously). Electronic service connecting/monitoring component 11 (FIG. 1) unpacks 167 bundle.gz and performs 169 a web request for configuration information 17 (FIG. 1), for example, an XML file with configuration commands, to server 19 (FIG. 1) which generates 171 configuration information 17 (FIG. 1) and returns 173 configuration information 17 (FIG. 1) to electronic service connecting/monitoring component 11 (FIG. 1) which runs 175 a configuration script from configuration information 17 (FIG. 1).

Figure 4:
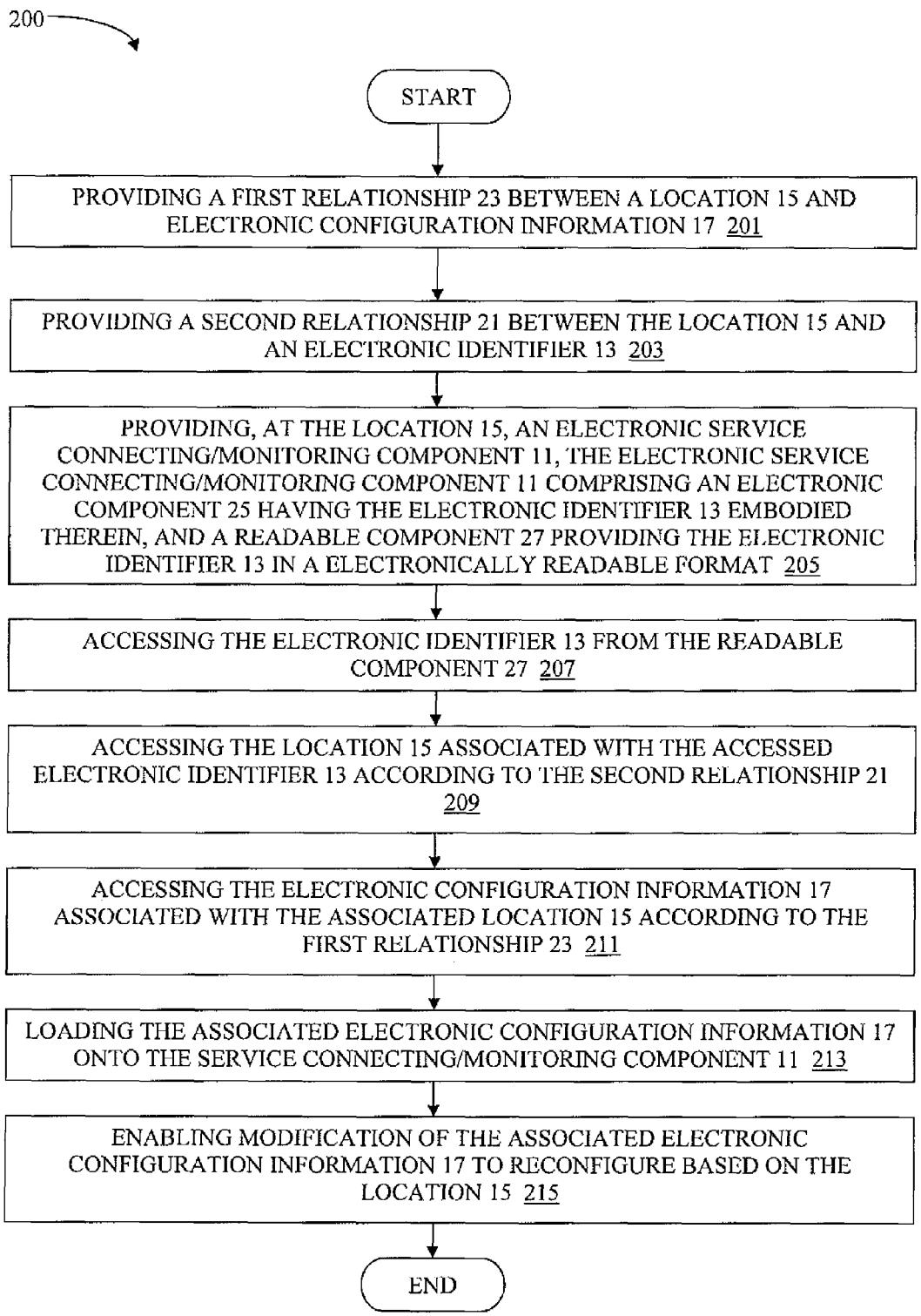
FIG. 4 is a flowchart of the method of the present teachings.

Referring now primarily to FIG. 4, method 200 for providing location-specific computer enabled services/monitoring, having minimally invasive reconfiguration/replacement can include, but is not limited to including, the steps of providing 201 first relationship 23 (FIG. 1) between location 15 (FIG. 1) and electronic configuration information 17 (FIG. 1), providing 203 second relationship 21 (FIG. 1) between location 15 (FIG. 1) and electronic identifier 13 (FIG. 1), and providing 205, at location 15 (FIG. 1), electronic service connecting/monitoring component 11 (FIG. 1). Electronic service connecting/monitoring component 11 (FIG. 1) can include, but is not limited to including, electronic component 25 (FIG. 1) having electronic identifier 13 (FIG. 1) embodied therein, and readable component 27 (FIG. 1) providing electronic identifier 13 (FIG. 1) in a electronically readable format. Method 150 can further include the steps of accessing 207 electronic identifier 13 (FIG. 1) from readable component 27 (FIG. 1), accessing 209 location 15 (FIG. 1) associated with accessed electronic identifier 13 (FIG. 1) according to the second relationship 21 (FIG. 1), accessing 211 electronic configuration information 17 (FIG. 1) associated with associated location 15 (FIG. 1) according to the first relationship 23 (FIG. 1), loading 213 associated electronic configuration information 17 (FIG. 1) onto service connecting/monitoring component 11 (FIG. 1), and enabling 215 modification of the associated electronic configuration information 17 (FIG. 1) to reconfigure location 15 (FIG. 1). Method 200 can also include the steps of configuring service connecting/monitoring component 11 (FIG. 1) as daughter card 61 (FIG. 2) having connection components 29 (FIG. 1) and power connectors 31 (FIG. 1) and configuring electronic component 25 (FIG. 1) as hot-swappable board 65 (FIG. 2). Hot-swappable board 65 (FIG. 2) can receive power from daughter card 61 (FIG. 2), and can include, but is not limited to including, processor 35 (FIG. 1) and computer readable memory 37 (FIG. 1) having computer readable code 39 (FIG. 1) embodied therein. Hot-swappable board 65 (FIG. 2) can execute the steps of accessing electronic configuration information 17 (FIG. 1) associated with location 15 (FIG. 1) and loading electronic configuration information 17 (FIG. 1). Method 200 can also include the step of configuring server 19 (FIG. 1) to provide first relationship 23 (FIG. 1) and second relationship 21 (FIG. 1).

Referring again now primarily to FIGS. 1 and 2, method 200 (FIG. 4) can further include the steps of installing the daughter card 61 (FIG. 2) at location 15 (FIG. 1), providing power connection 31 (FIG. 1) to daughter card 61 (FIG. 2), interconnecting daughter card 61 (FIG. 2) and server 19 (FIG. 1), installing hot-swappable board 65 (FIG. 2), detecting a failure in hot-swappable board 65 (FIG. 2), replacing the failing hot-swappable board with a new hot-swappable board, and configuring location 15 (FIG. 1) by downloading associated electronic configuration information 17 (FIG. 1) to the new hot-swappable board. The step of providing power to daughter card 61 (FIG. 2) can include, but is not limited to including, the steps of configuring power connection 31 (FIG. 1) as a central power supply, and interconnecting daughter card 61 (FIG. 2) to the central power supply. Method 200 can further include the steps of configuring power connection 31 (FIG. 1), for example, but not limited to, local, central, or in line, configuring server 19 (FIG. 1), building configuration information 17 (FIG. 1) on server 19 (FIG. 1), configuring service connecting/monitoring component 11 (FIG. 1) as daughter card 61 (FIG. 2), connecting daughter card 61 (FIG. 2) to power connection 31 (FIG. 1) and to server 19 (FIG. 1), installing hot-swappable board 65 (FIG. 2) having processor 35 (FIG. 1) and boot loader 41 (FIG. 1), receiving, in processor 35 (FIG. 1) by boot loader 41 (FIG. 1), boot information 55 (FIG. 2) from server 19 (FIG. 1), executing, in processor 35 (FIG. 1), boot information 55 (FIG. 2) to load operating system 57 (FIG. 1) from server 19 (FIG. 1) to processor 35 (FIG. 1), and executing operating system 57 (FIG. 1) to load associated electronic configuration information 17 (FIG. 1).

Continuing to refer primarily to FIGS. 1 and 2, method 200 (FIG. 4) can further include the optional steps of enabling real time communications between server 19 (FIG. 1) and hot-swappable board 65 (FIG. 2), integrating server 19 (FIG. 1) with other systems 43 (FIG. 1) to provide alerts 45 (FIG. 1) based on business rules 47 (FIG. 1), detecting events in hot-swappable board 65 (FIG. 2) by using business rules 47 (FIG. 1), receiving changes 58 (FIG. 1) to business rules 47 (FIG. 1) from other systems 43 (FIG. 1), configuring port 53 (FIG. 1) between server 19 (FIG. 1) and hot-swappable board 65 (FIG. 2) as an IEEE standard 802.1Q VLAN trunk with a management VLAN for management, and configuring management node 49 (FIG. 1) using the management VLAN. The step of executing boot information 55 (FIG. 2) can include, but is not limited to including, the steps of requesting a temporary IP address for hot-swappable board 65 (FIG. 2), receiving the temporary IP address, assigning the management VLAN for management communications, receiving a management node IP address to communicate with management node 49 (FIG. 1), requesting boot script 67 (FIG. 2) from management node 49 (FIG. 1) using the management node IP address and the management VLAN, choosing, at management node 49 (FIG. 1), boot script 67 (FIG. 2) based on a required action for hot-swappable board 65 (FIG. 2), downloading, using boot script 67 (FIG. 2), boot image 71 (FIG. 2) to hot-swappable board 65 (FIG. 2), downloading, using boot script 67 (FIG. 2), application disk image 73 (FIG. 2) to hot-swappable board 65 (FIG. 2), providing the management VLAN and an address of management node 49 (FIG. 1) to boot image 71 (FIG. 2), booting, from boot script 67 (FIG. 2), boot image 71 (FIG. 2), loading boot image 71 (FIG. 2) and application disk image 73 (FIG. 2) into memory 37 (FIG. 1) of hot-swappable board 65 (FIG. 2), retrieving, from hot-swappable board 65 (FIG. 2), daughter card unique identifier 13 (FIG. 1), requesting a daughter card IP address associated with daughter card unique identifier 13 (FIG. 1), and receiving the daughter card IP address. The action can be, for example, but not limited to, upgrading, testing, and booting. The step of executing operating system 57 (FIG. 1) can include, but is not limited to including, the steps of retrieving the IP address associated with electronic identifier 13 (FIG. 1) and the management node IP address, translating electronic configuration information 17 (FIG. 1) to configuration commands, setting hot-swappable board 65 (FIG. 2) into a configuration mode, configuring hot-swappable board 65 (FIG. 2) based on the configuration commands, transitioning from the configuration mode to an operational mode, and reporting, from hot-swappable board 65 (FIG. 2), a status of hot-swappable board 65 (FIG. 2) to management node 49 (FIG. 1). The step of translating electronic configuration information 17 (FIG. 1) can include, but is not limited to including, the steps of receiving electronic configuration information 17 (FIG. 1) in XML format from server 19 (FIG. 1), and executing code, for example, but not limited to, a PHP script, on hot-swappable board 65 (FIG. 2) to parse electronic configuration information 17 (FIG. 1) into a configuration batch file. The step of transitioning from the configuration mode can include, but is not limited to including, the steps of executing the configuration batch file to configure hot-swappable board 65, and reporting the status to server 19 (FIG. 1). The step of reporting can include, but is not limited to including, the steps of maintaining an event log, reporting the status in real time, providing the event log to the management node, and reporting the status periodically.

An exemplary configuration process can include the steps of building a configuration in a database or by use of an XML file, inserting hot-swappable board 65 (FIG. 2) into daughter card 61 (FIG. 2), and configuring a port as, for example, but not limited to, an IEEE standard 802.1x virtual local area network (VLAN) trunk with a management VLAN for management. A resident bootloader can make a Dynamic Host Configuration Protocol (DHCP) request on the management VLAN, DHCP provides the daughter card internet protocol (IP) address, DHCP provides the management VLAN, and DHCP provides address of management node 49 (FIG. 1). The resident bootloader can be configured to support load or boot script 67 (FIG. 2) so that the boot process can happen in two phases, namely, phase one in which firmware resident on hot-swappable board 65 (FIG. 2), for example, a basic input/output system (BIOS), retrieves the location of operating system 57 (FIG. 1) and loads operating system 57 (FIG. 1). Phase two can include retrieving, by operating system 57 (FIG. 1) from management node 49 (FIG. 1), the applications and other information needed to perform specific tasks. Using hypertext transfer protocol (HTTP) transport, the resident bootloader can request boot script 67 (FIG. 2) from management node 49 (FIG. 1), management node 49 (FIG. 1) can use a computer scripting language page such as, for example, personal home page (PHP) or active server page (ASP) to determine required script. Boot script 67 (FIG. 2) could be, for example, but not limited to, for firmware upgrading, testing, and/or booting. Boot script 67 (FIG. 2) can download via boot image 71 (FIG. 2) such as, for example, HTTP zImage.gz Linux boot image, or script downloads via, for example, HTTP Ramdisk.gz application disk image. Boot script 67 (FIG. 2) can execute from a kernel image to bootstrap operating system 57 (FIG. 1), for example, the LINUX® operating system. The management VLAN and an IP address can be passed in as kernel parameters. Operating system 57 (FIG. 1) and application disk image 73 (FIG. 2) can be loaded, and, at the application level, and operating system 57 (FIG. 1) can retrieve the daughter card MAC to use as identifier 13 (FIG. 1). Optionally, identifier 13 (FIG. 1) can be used as a masqueraded MAC for the DHCP request so as to retain a static IP. An Ethernet interface can be configured for the management VLAN for management node 49 (FIG. 1). The management VLAN can be separated from the rest of the network and can be discovered by the hot-swappable board 65 (FIG. 2). In this process, DHCP operates at operating system level booting to retrieve the IP address of management node 49 (FIG. 1) on the management VLAN of management node 49 (FIG. 1). The hot-swappable board 65 (FIG. 2) can download special software in addition to operating system 57 (FIG. 1), for example, boot bundle.gz, to retrieve scripts and files the can control the next steps. The special software can be customized according to electronic identification 13 (FIG. 1). The download can be controlled by, for example, but not limited to, PHP or ASP 79 (FIG. 2) on management node 49 (FIG. 1), and can be tailored based on the MAC and/or identifier 13 (FIG. 1) sent to management node 49 (FIG. 1). Also, behavior can be changed based on business rules 47 (FIG. 1) accessible within management node 49 (FIG. 1). Business rules 47 (FIG. 1) can include, but are not limited to including,
test, location, and product type rules. After a configuration file such as, for example, config.xml, is downloaded, the configuration file can be translated to configuration commands which can then be executed to configure status reporting to management node 49 and periodic heartbeat, both in real-time. A log can be maintained, and web services can be provided.

Continuing to refer primarily to FIGS. 1 and 2, to accommodate fault detection, there can be software executing on hot-swappable board 65 (FIG. 2) that monitors hot-swappable board 65 (FIG. 2) for problems through configurable business rules 47 (FIG. 1). To facilitate communication among devices in system 100 (FIG. 1) in real time, a web service such as XML web service, can be used. System 100 (FIG. 1) can be integrated with other systems 43 (FIG. 1) such as, for example, property management systems, that can track whether or not, for example, but not limited to, a hotel room is occupied. For example, if the air conditioning isn't working in a hotel room, and if the room is occupied, an immediate alert 45 (FIG. 1) can be raised; otherwise, a non-immediate alert 45 (FIG. 1) can be raised. Business rules 47 (FIG. 1) can automatically be modified by other systems 43 (FIG. 1) in communications network 59 (FIG. 1).

Continuing to refer to FIGS. 1 and 2, an embodiment of system 100 (FIG. 1) can include a structured wire panel, which contains connections for daughter card 61 (FIG. 2), and in which daughter card 61 (FIG. 2) is installed before the electronics are in place, to allow for standalone testing of the wiring. At the same time, a database can be built that has unique identifiers 13 (FIG. 1) and associated configuration information 17 (FIG. 1). The unique identifier 13 (FIG. 1), room number, and configuration information 17 (FIG. 1) are eventually correlated by system 100 (FIG. 1). Daughter card 61 (FIG. 2) and hot-swappable card 65 (FIG. 2), where room center intelligence reside, can connect through a network, such as a local area network, to server 19 (FIG. 1) that can be set up and monitored and can connect, for example, to the internet, and can become a NOC 81 (FIG. 1) that can maintain a system of room centers. After hot-swappable board 65 (FIG. 2) is installed, its unique identifier 13 (FIG. 1) is read and transferred to a database that contains information about the system of room centers keyed by unique identifiers 13 (FIG. 1). Hot-swappable board 65 (FIG. 2), after installed in daughter card 61 (FIG. 2), uses its identification to build configuration file 18 (FIG. 1) and to configure itself. The DHCP protocol can be used to provide unique identifier 13 (FIG. 1), and HTTP can be used to provide the required handshaking. Boot script 67 (FIG. 2) that can download operating system 57 (FIG. 1) can be provided to hot-swappable board 65 (FIG. 2), which can include processor 35 (FIG. 1), power connection 31 (FIG. 1), and memory 37 (FIG. 1).

Continuing to still further refer primarily to FIGS. 1 and 2, power connection 31 (FIG. 1) can be a 48-Volt power supply that can be connected to daughter card 61 (FIG. 2), and can be a central power supply that supplies power to a number of electronic service connecting/monitoring components 11 (FIG. 1), or a local power supply. Power connections 31 (FIG. 1) can be strategically located throughout the building in order to provide centralized or local power, where appropriate.

Referring to FIGS. 1, 3, and 4, methods 150 (FIG. 3), and 200 (FIG. 4) of the present embodiment can be, in whole or in part, implemented electronically. Signals representing actions taken by elements of system 100 (FIG. 1) can travel over electronic communications network 79 (FIG. 1). Control and data information can be electronically executed and stored on a computer-readable medium such as that storing configuration file 18 (FIG. 1). System 100 (FIG. 1) can be implemented to execute on a node such as server 19 (FIG. 1) in communications network 59 (FIG. 1). Common forms of computer-readable media can include, but are not limited to, for example, a floppy disk, a flexible disk, a hard disk, magnetic tape, or any other magnetic medium, a CDROM or any other optical medium, punched cards, paper tape, or any other physical medium with patterns of holes or ink or characters, a RAM, a PROM, and EPROM, a FLASH-EPROM, or any other memory chip or cartridge, or any other medium from which a computer can read.

Although various embodiments are described herein, it should be realized that a wide variety of further and other embodiments can be realized with the disclosed technology.

What is claimed is:

1. A method providing location-specific computer enabled services and monitoring, having minimally invasive reconfiguration and replacement, the method comprising the steps of:
   providing, from a server, a first relationship of a network addressing between a location and electronic configuration information;
   providing, from the server, a second relationship of a uniquely identifying between the location and an electronic identifier of the location;
   providing, at the location, an electronic service connecting/monitoring component as a daughter card, and a hot-swappable board electronic component having a readable component providing the electronic identifier in an electronically readable format and a boot loader receiving boot info including a boot script from the server;
   accessing the electronic identifier from the readable component;
   accessing the location associated with the accessed electronic identifier according to the second relationship;
   accessing the electronic configuration information associated with the associated location according to the first relationship;
   loading the electronic configuration information associated with the location from the server onto the service connecting/monitoring component of the location;
   executing, in the processor, the boot script to load an operating system from the server to the processor; and
   executing the operating system to perform said loading the electronic configuration information from the server, thereby enabling modification of the associated electronic configuration information to reconfigure based on the location;
   wherein the hot-swappable board communicating a status of the hot-swappable board with the server according to business rules.

2. The method as in claim 1 further comprising the steps of:
   configuring the service connecting/monitoring component having connection components and power connectors;
   configuring the hot-swappable board receiving power from the daughter card, the hot-swappable board comprising a processor and a computer readable memory having computer readable code embodied therein, the hot-swappable board for executing said steps of accessing the electronic configuration information associated with the location and loading the electronic configuration information; and
   configuring said server to perform said steps of providing the first relationship and providing the second relationship.

3. The method as in claim 2 further comprising the steps of:
   installing the daughter card at the location;
   providing power connection to the daughter card;
   interconnecting the daughter card and the server;
   installing the hot-swappable board;
   detecting a failure in the hot-swappable board;
   replacing the failing hot-swappable board with a new hot-swappable board; and
   configuring the location by downloading the associated electronic configuration information to the new hot-swappable board.

4. The method as in claim 3 wherein said step of providing power connection to the daughter card comprises the steps of:
   configuring the power connection as a central power supply; and
   interconnecting the daughter card to the central power supply.

5. The method as in claim 1 further comprising the steps of:
   configuring a power connection;
   configuring the server;
   building the configuration information on the server;
   configuring the daughter card;
   connecting the daughter card to the power connection and to the server; and
   installing the hot-swappable board having the processor and the boot loader.

6. The method as in claim 5 further comprising the step of:
   enabling real time communications between the server and the hot-swappable board.

7. The method as in claim 5 further comprising the step of:
   integrating the server with other systems to provide alerts based on the business rules.

8. The method as in claim 7 further comprising the steps of:
   detecting events in the hot-swappable board by using the business rules; and
   receiving changes to the business rules from the other systems.

9. The method as in claim 5 further comprising the steps of:
   configuring a port between the server and the hot-swappable board as an IEEE 802.1Q VLAN trunk with a management VLAN for management; and
   configuring a management node using the management VLAN.

10. The method as in claim 9 further comprises the steps of:
   requesting a temporary IP address for the hot-swappable board;
   receiving the temporary IP address;
   assigning the management VLAN for management communications;
   receiving a management node IP address to communicate with the management node;
   requesting a boot script from the management node using the management node IP address and the management VLAN;
   choosing, at the management node, the boot script based on a required action for the hot-swappable board;
   downloading, using the boot script, a boot image to the hot-swappable board;
   downloading, using the boot script, an application to the hot-swappable board;
   providing the management VLAN and the management node IP address to the boot image;
   booting, from the boot script, the boot image;
   loading the boot image and the application into memory of the hot-swappable board;
   retrieving, from the hot-swappable board, the daughter card unique identifier;
   requesting a daughter card IP address for the daughter card unique identifier; and
   receiving the daughter card IP address.

11. The method as in claim 10 further comprising the step of:
selecting the action from a group consisting of firmware upgrade, testing, and booting.

12. The method as in claim 10 wherein said step of executing the operating system comprises the steps of:
retrieving the electronic configuration information associated with the electronic identifier from the management node using the management node IP address;
translating the electronic configuration information to configuration commands;
setting the hot-swappable board into a configuration mode;
configuring the hot-swappable board based on the configuration commands;
transitioning from the configuration mode to an operational mode; and
reporting, from the hot-swappable board, the status of the hot-swappable board to the management node.

13. The method as in claim 12 wherein said step of translating the electronic configuration information comprises the steps of:
receiving the electronic configuration information in XML format from the server; and
executing code on the hot-swappable board to parse the electronic configuration information into a configuration batch file.

14. The method as in claim 13 wherein said step of transitioning from the configuration mode comprises the steps of:
executing the configuration batch file to configure the hot-swappable board; and
reporting the status to the server.

15. The method as in claim 12 wherein said step of reporting comprises the steps of:
maintaining an event log;
reporting the status in real time;
providing the event log to the management node; and
reporting the status periodically.

16. A system providing location-specific computer enabled services and monitoring, having minimally invasive reconfiguration and replacement, the system comprising:
a relationship provider enabling a first relationship of a network addressing between a location and electronic configuration information from a server and a second relationship of uniquely identifying between said location and an electronic identifier of the location;
a service connecting/monitoring component as a daughter card at the location including a hot-swappable board electronic component having the electronic identifier embodied therein, a boot loader, and a readable component providing said electronic identifier in an electronically readable format;
an accessor accessing an accessed said electronic identifier from said readable component, accessing said location associated with the accessed said electronic identifier according to said second relationship, and accessing said electronic configuration information associated with the associated location according to said first relationship; and
a server loading the associated said electronic configuration information onto said service connecting/monitoring component and enabling modification of the associated said electronic configuration information to reconfigure based on said location;
wherein said service connecting/monitoring component receives boot information including a boot script from said server into a processor, executes said boot information to load an operating system from said server to said processor, and executes said operating system to load the associated said electronic configuration information downloaded from said server;
wherein said hot-swappable board communicates a status of said hot-swappable board with said server according to business rules.

17. The system as in claim 16 wherein said service connecting/monitoring component having connection components and power connection,
wherein said hot-swappable board receiving power through said power connection from said daughter card, said hot-swappable board including the processor and a computer readable memory having computer readable code embodied therein, the hot-swappable board for accessing said electronic configuration information associated with said location and loading said electronic configuration information, and
wherein said server provides said first relationship and said second relationship.

18. The system as in claim 17
wherein said daughter card is installed at said location, said power connection is provided to said daughter card, said daughter card and said server are interconnected, and said hot-swappable board is installed; and
detects a failure in said hot-swappable board and enables replacing the failing hot-swappable board with a new hot-swappable board,
wherein said server configures said location by downloading the associated said electronic configuration information to said hot-swappable board, and enables real time communications between said server and said hot-swappable board.

19. The system as in claim 18 wherein said power connection is a central power supply.

20. The system as in claim 16 wherein said server is integrated with other systems to provide alerts based on said business rules,
wherein said server detects events in said hot-swappable board by using said business rules, and receives changes to said business rules from said other systems, and
wherein said server configures a port between said server and said hot-swappable board and configures a management node.

21. The system as in claim 18 wherein said service connecting/monitoring component comprises components for:
requesting a temporary IP address for said hot-swappable board;
receiving said temporary IP address;
assigning a management VLAN for management communications;
receiving a management node IP address to communicate with said management node;
requesting a boot script from said management node using said management node IP address and said management VLAN;
choosing, at said management node, said boot script based on a required action for said hot-swappable board;
downloading, using said boot script, a boot image to said hot-swappable board;
downloading, using said boot script, an application to said hot-swappable board;
providing said management VLAN and an address of said management node to said boot image;
booting, from said boot script, said boot image;
loading said boot image and said application into memory of said hot-swappable board;

retrieving, from said hot-swappable board, said daughter card unique identifier;
requesting a daughter card IP address for said daughter card unique identifier;
receiving said daughter card IP address;
retrieving said electronic configuration information associated with said electronic identifier from said management node using said management node IP address;
translating said electronic configuration information to configuration commands;
setting said hot-swappable board into a configuration mode;
configuring said hot-swappable board based on said configuration commands;
transitioning from said configuration mode to an operational mode; and
reporting, from said hot-swappable board, a status of said hot-swappable board to said management node.

22. The system as in claim 21 wherein said service connecting/monitoring component comprises components for;

receiving said electronic configuration information in XML format from said server;
executing code on said hot-swappable board to parse said electronic configuration information into a configuration batch file;
executing said configuration batch file to configure said hot-swappable board;
maintaining an event log;
reporting said status in real time;
providing said event log to said management node; and
reporting said status periodically.

23. A non-transitory computer-readable medium having computer readable code stored instructions therein to carry out the method according to claim 1.

24. A node in a communication network executing instructions to carry out the method according to claim 1.

25. A communications network having a node executing instructions to carry out the method according to claim 1.

* * * * *